(No Model.)
J. H. CAMPBELL.
SIDE BEARING FOR CARS.
No. 530,579. Patented Dec. 11, 1894.
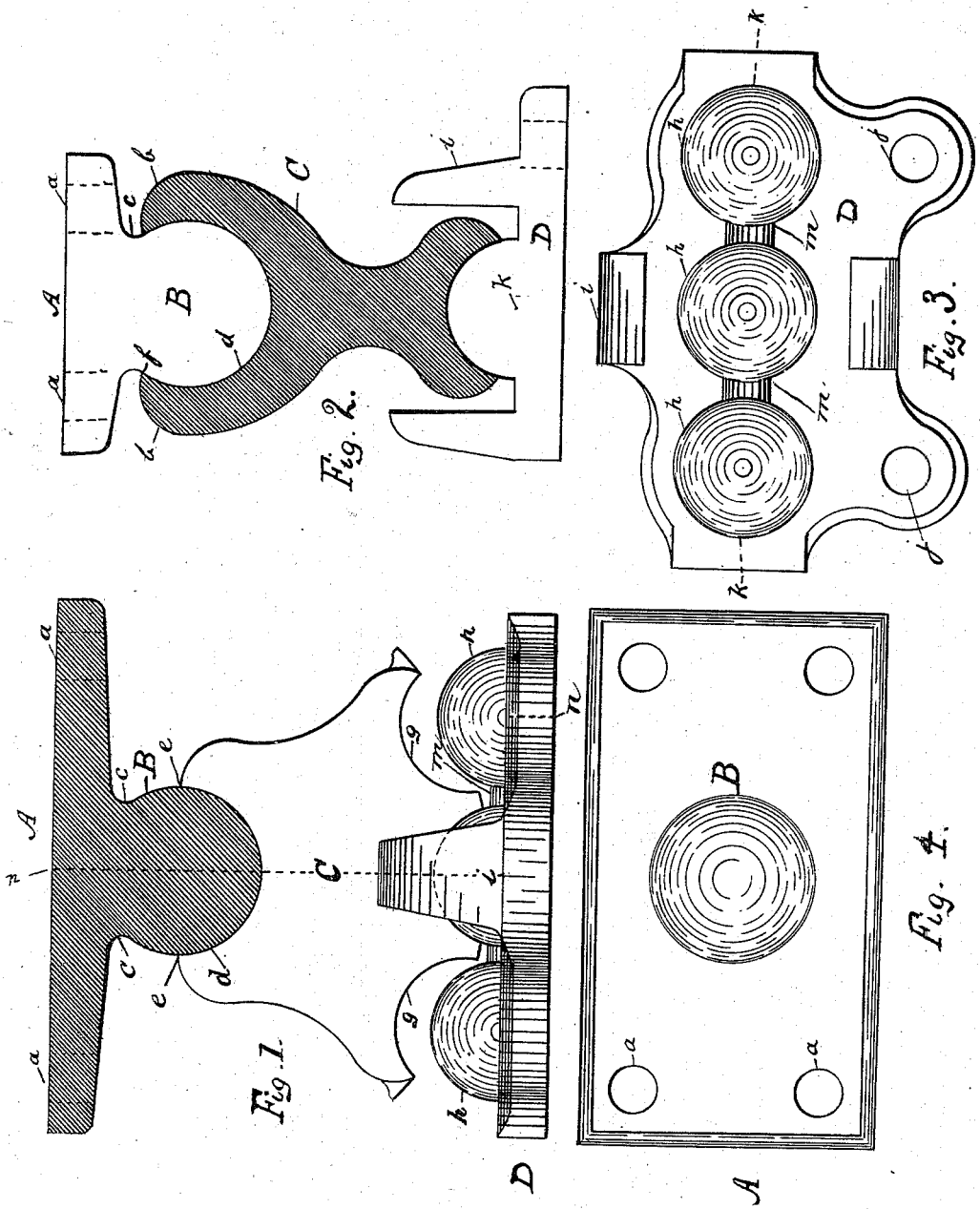

ature with the sam
UNITED STATES PATENT OFFICE.

JOSEPH H. CAMPBELL, OF CHICAGO, ILLINOIS.

SIDE BEARING FOR CARS.

SPECIFICATION forming part of Letters Patent No. 530,579, dated December 11, 1894.

Application filed December 11, 1893. Serial No. 493,333. (No model.)

*To all whom it may concern:*

Be it known that I, JOSEPH H. CAMPBELL, a citizen of the United States, residing at Chicago, in the county of Cook and State of Illinois, have invented a new and useful Side Bearing for Railway-Cars and other Vehicles, of which the following is a specification.

My invention relates to improvements in side bearings for railway cars and particularly to that class of side bearings known as anti friction.

The object of my invention, is to provide a simple, strong and durable side bearing, which will be composed of the fewest number of parts possible; and shall be in its construction so adapted to its work that it shall be able to sustain the very irregular and unequal stress to which the side bearings of railway cars are subject, and at the same time its tendency shall be to always retain its original shape, so that its usefulness will not be impaired during its life under the car.

My invention is an entirely new departure from the usual line of designs for anti friction side bearings. I have observed that the reciprocating freedom necessary to an anti friction side bearing between the body and truck bolsters of a car, are identical with the freedom of action in the arm of the human being between the shoulder and elbow joints; and with the humerus bone of the arm as my guide, I have been enabled to invent and design this anti friction side bearing.

I found great difficulty in working out the problem of making the humerus or center piece of this side bearing; loosely dependent from the upper member, and at the same time have them both solid castings. The use of bolts or rivets or other fastenings in this case being impracticable, all such appliances when forming part of a side bearing, by the continual pounding and lateral stress to which they are subject become loosened and break or shear off. In no instance in any branch of mechanics have I been able to find a ball and socket joint made of two solid castings; the outer castings being invariably bolted or riveted over the ball; but by taking advantage of the properties of the expansion and contraction of metals, I was enabled to solve the problem of making one solid casting loosely dependent from another solid casting. Of the many different designs and devices for anti friction side bearings heretofore manufactured there are none but what have serious defects in their design and construction, which defects can only be overcome by an entire departure from the old lines and theories of others. With this knowledge and with these ends in view, I have been enabled to perfect my invention which consists in the construction and combination of parts as hereinafter described and claimed.

This invention relates to that class of side bearings known as anti friction, and consists of an upper ball or knuckle and plate, said knuckle being of a convex spheroidal form; an intermediate depending humeral or segmental rocker, between the upper and lower bearing surfaces, and a lower bearing or radius plate, provided with a sufficient number of convex spheroidal eminences to insure the necessary radial movement to the truck bolster, said parts being made of any suitable materials; and it is understood that this knuckle joint side bearing is adapted to any kind of a railway car, or other vehicle and is intended to be attached to any kind of a bolster or transom used in the construction of the same.

Reference is to be had to the accompanying drawings, forming a part of this specification, in which similar letters of reference indicate corresponding parts in all the figures.

Figure 1 is a side view of this knuckle joint side bearing, with the convex spheroidal knuckle and plate shown in section: the intermediate rocker or humeral shown in outline, and the lower bearing or radius plate shown in front view. Fig. 2 is a cross section of the same on the dotted line, *n, n.* Fig. 3 is a plan of the lower bearing or radius plate; showing spheroidal eminences, *h,* and guides, *i.* Fig. 4 is a plan of the knuckle plate and knuckle.

The upper or knuckle bearing, B, as shown in Figs. 1, 2 and 4, in conjunction, with the upper end of the segmental or intermediate rocker, C, forms a swivel and is the primary point from which the car truck receives its lateral and longitudinal freedom of motion. The plate A of the knuckle bearing is provided with holes, *a, a,* through which pass bolts or screws to fasten the same to the body bolster or transom of the car. The knuckle B being of a convex spheroidal form is continued beyond the transverse center of the sphere at $e$, as far as necessary to insure that the upper jaws or lips of the rocker at $b$, shall have sufficient grasp of the knuckle to prevent its coming off or the disconnection of the rocker from its place; the size and form of the knuckle at its intersection, $c$, with the plate being made, to comply with the necessities of the case; arising from its application to the different designs of cars and the weight sustained.

The depending segmental rocker or humeral, C, is the connecting filler between the knuckle, B, and the lower bearing or radius plate, D, said rocker having a convex spheroidal cavity, $d$, at the upper end; two opposite sides, $e$, $e$, of which rise not higher than the radial center of the knuckle; while the two sides on the other angle of the rocker, $b$, $b$, pass around the knuckle beyond its radial center and form the jaws or lips, $b$, which being loosely in contact with the reduced diameter of the knuckle at that point; sustain the weight of the rocker when in pendent freedom, and the knuckle, B, being cast loosely in the cavity, $d$, sustains the rocker in free suspension when it is not in contact with the lower bearing or radius plate. In the outer radius or segment of the rocker, are three (or as many as may be necessary) spheroidal cavities, $g$, of equal pitch with and acting in contact with the semi spherical eminences, $h$; so that when the surfaces, $h$, and $g$, are brought in contact by the superincumbent weight there will be a perfectly free and correct action in either direction. The lower bearing or radius plate D, has three (or as many as may be necessary) semi-spherical eminences, $h$, placed in radial alignment, K, in pitch with and to accommodate the spherical cavities, $g$, when brought over and in conjunction with them. Between these semi spheres, $h$, are the semi cylindrical fillers or raisers, $m$, the object of which is to ease the rocker over when taking the step from one pitch to another on extreme action. The lower bearing is also provided with two emergency guides, $i$, the size and shape of which may be changed, and which are intended to assist the rocker to regain its proper position, if moved by extraordinary action. The lower bearing is provided with holes, $j$, as may be necessary to properly fasten it with screws or bolts to the bolster or swinging beam.

It is probable that in certain cases I shall have to change the relative position of the spheroidal eminences and cavities to comply with certain circumstances. I therefore reserve the right to reverse the order of the spheroids by placing the concaves on the upper plate, A, and the radius plate, D, and the convexes on the rocker, C, or part of the concaves and part of the convexes on each of the plates and rocker.

I am not aware that prior to my invention that this idea and design of the knuckle joint of two solid castings, being cast loosely one into the other has ever been used before, upon any machine; or that the idea suggested in the form of the humerus of the human anatomy has ever been incorporated into any prior invention.

Having thus fully set forth my invention, what I claim as new, and desire to secure by Letters Patent, is—

1. In a ball and socket or knuckle joint side bearing for railway cars and other vehicles: the combination of the swivel or base, A, having a spheroidal projection, B, the intermediate, semi circular or quadrant rocker, C, with lipped socket, $d$, and the radius or tread plate, D, provided with semi spherical projections, $h$, said combination being adapted to be placed between the body and truck bolsters of railway cars and other vehicles substantially as described.

2. In a ball and socket or knuckle joint side bearing for railway cars and other vehicles: the combination with the body bolster or transom; of a base, A, having a pendent spheroidal projection, B, said base being provided with the holes, $a$, as necessary, for fastening the same to the bolster, the intermediate rocker, C, and a suitable support, D, for the same, adapted to rest on the truck; substantially as described.

3. In a ball and socket or knuckle joint side bearing, the combination of the base, A, having the spheroidal projection, B, the intermediate rocker or humeral, C, provided with the spheroidal indention or lipped socket, $b$, and being loosely in conjunction with the ball, B, and its outer side or arc, provided with the semi spherical indentions, $g$, and a suitable tread plate, D, for the same to tread upon substantially as described.

4. In a ball and socket side bearing, the combination of the base A having the spheroidal projection, B, the rocker, C, provided with the spheroidal indention or lipped socket, $b$, and semi spherical indentions, $g$, in pitch with and adapted to tread upon the semi spheres, $h$, of the radius or tread plate, D, substantially as described.

5. In a side bearing for railway cars and other vehicles, the combination of the radius plate, D, adapted to be attached to a centrally pivoted truck of said cars, said radius plate having a series of semi spherical projections, $h$, arranged radially with the center of said truck; the segmental rocker, C, having corresponding semi spherical indentions, $g$, and adapted to tread upon said semi spheres; and the base or ball plate, A, provided with the spheroidal projection B substantially as described.

6. In a side bearing of a base, A, the rocker, C, and a radius or tread plate, D, said tread plate being provided with the semi-spherical projections, $h$, the raised guides, $i$, the semi-cylindrical fillers, $m$, and suitable holes, $j$, to fasten the same to the truck bolster substantially as described.

7. A ball and socket or knuckle joint side bearing, for railway cars or other vehicles; said side bearing, being a combination of a base A provided with a pendent spheroidal projection or ball B, a rocker C, provided with a spheroidal indention or lipped socket b, and being loosely depending from the ball B; and its lower side or arc provided with semi spherical indentions, in pitch with, and adapted to tread upon the semi spheres, h, a lower bearing or truck bolster plate, D, provided with semi spherical projections, and vertical guides, and the semi cylindrical fillers, m; substantially as described.

JOSEPH H. CAMPBELL.

Witnesses:
HENRY TYERMAN,
OVI GEDDE.